United States Patent [19]

Barbosa et al.

[11] Patent Number: 4,643,254
[45] Date of Patent: Feb. 17, 1987

[54] PROCESS FOR THE CORRECTION OF OIL WELL PRODUCTIVITY AND/OR INJECTIVITY PROFILES

[75] Inventors: Luiz C. F. Barbosa; Adelman M. Ribeiro; Euclides J. Bonet; Celso C. M. Branco, all of Rio de Janeiro, Brazil

[73] Assignee: Petroleo Brasileiro S.A. - Petrobras, Rio de Janeiro, Brazil

[21] Appl. No.: 730,971

[22] Filed: May 6, 1985

[30] Foreign Application Priority Data

May 4, 1984 [BR] Brazil .................................. 8402084

[51] Int. Cl.$^4$ ........................................... E21B 33/138
[52] U.S. Cl. ................................... 166/292; 166/270; 166/294
[58] Field of Search ............... 166/292, 270, 271, 274, 166/294

[56] References Cited

U.S. PATENT DOCUMENTS

| | | | |
|---|---|---|---|
| 2,198,120 | 4/1940 | Lerch et al. | 166/292 |
| 2,207,759 | 7/1940 | Reimers | 166/292 |
| 2,236,147 | 3/1941 | Lerch et al. | 166/292 |
| 2,237,313 | 4/1941 | Prutton | 166/292 X |
| 3,285,338 | 11/1966 | Boston | 166/270 |
| 3,375,872 | 4/1968 | McLaughlin et al. | 166/292 |
| 4,069,869 | 1/1978 | Sandiford | 166/270 |
| 4,081,029 | 3/1978 | Holm | 166/270 |
| 4,141,416 | 2/1979 | Holm | 166/270 |
| 4,325,433 | 4/1982 | Yen et al. | 166/271 X |
| 4,332,297 | 6/1982 | Sandiford | 166/270 |

Primary Examiner—Stephen J. Novosad
Attorney, Agent, or Firm—Sughrue, Mion, Zinn, Macpeak & Seas

[57] ABSTRACT

A process for the correction of oil well productivity, or injection profiles, or both, is disclosed. The process includes injecting a dilute solution of hydrochloric acid having a concentration less than 1% via an oil well into an adjacent subsurface formation, followed by injecting a solution of sodium silicate and hydrochloric acid into the formation, and then shutting in the well for several hours. The dilute hydrochloric acid solution and the sodium silicate-hydrochloric acid solution may each be displaced into the formation with injection water. Best results are achieved when systems based on sodium silicate and hydrochloric acid of long-curing time are injected, followed by systems based on sodium silicate and hydrochloric acid of short-curing time.

4 Claims, No Drawings

PROCESS FOR THE CORRECTION OF OIL WELL PRODUCTIVITY AND/OR INJECTIVITY PROFILES

SCOPE OF THE INVENTION

The invention refers to permeability reduction in areas adjacent to petroleum recovery wells.

In the present report and in the claims attached thereto, petroleum is defined as being any mixture of hydrocarbons found in nature, either in gaseous, liquid or solid state.

More specifically, the invention refers to a silicate-based process and system designed to block permeable zones in wells under secondary recovery through water injection.

DESCRIPTION OF THE PREVIOUS TECHNIQUE

When water is injected into a well, with the purpose of sweeping petroleum to adjacent producing wells, a series of factors may occur which contribute to the reduction, or even to the impossibility, of an even displacement of water through the formation. Among those factors which affect water injection, the following may be mentioned: permeability variation inside the zone or inside the producing intervals, the presence of natural or induced fractures in the formation, and the mobility ratio associated to oil viscosity. This contributes to the formation of preferential channels and the consequent reduction of the area swept.

There are several techniques designed to correct the productivity and/or injectivity profile and improve the efficiency of petroleum displacement through water injection. In addition to packer utilization, the techniques may be classified into two groups: I—With treatment at the well bore; II—With treatment inside the formation.

The treatment at the well bore, which consists of the injection of cement or particles with controlled granulometry into the interval which is causing the problem, includes the formation of a cake more or less permeable at the well bore. Due, however, to the little or no penetration into the formation, this type of treatment does not allow to correct problems of microstratification with intervals of different permeabilities.

The treatment inside the formation includes the injection, as a liquid phase, of systems based on polymers, silicates or salt solutions susceptible of precipitation. These systems may reach a considerable penetration since, in the reservoir, they gel, precipitate or are adsorbed by the rock walls, after a time interval. Depending on the system selected and the situation of the problem which is to be solved, full or partial plugging may be achieved.

SUMMARY OF THE INVENTION

The invention has as its purpose a liquid system based on sodium silicate and hydrochloric acid which, once it is injected, gels inside the formation, achieving drastic permeability reductions close to the well, being thus applicable in isolated zones of high permeability.

The permeability-blocking system of the invention makes it possible to mix the reagents, which are manufactured in this Country and inexpensive, in addition to achieving an excellent injectivity and penetration in the formation, since the viscosity of the system is practically equal to that of water.

The invention includes also a process for permeability reduction close to the injection well. The process comprises the injection of a diluted solution of hydrochloric acid, the injection of a solution of sodium silicate and hydrochloric acid and the shutting-in of the well during several hours, preferably around 24 hours.

The system and the process according to the invention may be applied to high- or medium-permeability zones. Permeability reduction is achieved with uncomplicated execution and operational flexibility; different levels of penetration are achieved and its application is also possible in oil-producing wells.

DETAILED DESCRIPTION OF THE INVENTION

The permeability-blocking system of the invention may include:
- a—Sodium silicate and hydrochloric acid diluted in deionized water;
- b—Sodium silicate and hydrochloric acid diluted in injection water;
- c—Sodium silicate and hydrochloric acid diluted in a polymer solution.

Sodium silicate is commercially available in a concentration of 29% in $SiO_2$. This product, the density of which is 1.395 and the viscosity of which is 350 cp at 20° C., must be diluted down to a concentration between 5% and 20% in weight per volume in $SiO_2$. The solutions are prepared mixing the silicate with a polymer solution or with water, obtaining a pre-mix, to which hydrochloric acid is added.

The diluted sodium silicate is in the pre-mix in a concentration of nearly 30 to 40% in volume, preferably 34.49% in volume.

The hydrochloric acid solution must present a concentration between 1 and 10% in weight per volume, preferably 5% in weight/volume.

An accurate concentration of this acid is indispensable to control gelling time. The system is also very sensitive to the volume of acid used, and this acid must be always added to the pre-mix, never the opposite way.

The volumetric ratio of hydrochloric acid to the pre-mix is between 1:5 and 1:3.3, preferably 1:4.54 in case a long curing time is desirable, and 1:4 in case a short curing time is preferable.

The polymer solution includes polyacrylamide with a hydrolysis degree up to approximately 50% and diluted in water in an amount sufficient to reach a minimum concentration of nearly 660 ppm of active matter. This polymer solution may then be employed in the preparation of pre-mixes, to which hydrochloric acid is added.

With the systems and process of the invention, gelling or curing times are achieved which may vary from 15 minutes to more than 8 hours.

The preparation of a pre-mix with injection water allows achieving a considerable reduction in gelling time due to the presence, in this water, of salts in solution.

This water injection in the Carmópolis field presented the following characteristics:

| | |
|---|---|
| pH | 7.65 |
| Density at 20° C. | 1.0114 |
| Total dissolved salts | 444.0 mg/l |
| Sodium (Na+) | 43.0 mg/l |
| Calcium (Ca++) | 61.0 mg/l |

-continued

| | |
|---|---|
| Barium (Ba++) | 0.07 mg/l |
| Strontium (Sr++) | 0.10 mg/l |
| Magnesium (Mg++) | 15.0 mg/l |
| Chlorides (Cl−) | 61.0 mg/l |
| Chlorides (NaCl) | 100.6 mg/l |
| Carbonates (CO$_3$=) | 0.0 mg/l |
| Bicarbonates (HCO$_3$−) | 253.0 mg/l |
| Sulfate (SO$_4$=) | 11.0 mg/l |
| Stability index (25° C.) | 0.481 |
| Stability index | 0.641 |

When a pre-mix is prepared utilizing a polymer solution a slight acceleration may be achieved in the beginning of gelling or curing time.

To prevent the protons of the system of the invention from being absorbed by the formation, thus hindering gel formation, it is necessary to saturate the porous medium with protons or another cation, prior to injecting the silicate/hydrochloric acid system.

This saturation may be achieved through the injection of a pre-flush of a diluted solution of hydrochloric acid.

The hydrochloric acid concentration should be around 1% or, preferably, around 0.1%; other cations may be used for the purpose of formation conditioning.

Thus, it is also the object of the present invention to provide a process for permeability reduction in formations near recovery wells. This process includes the following steps:

a—Injection of a diluted solution of hydrochloric acid;
b—Injection of a sodium silicate/hydrochloric acid solution of long curing time;
c—Injection of a sodium silicate/hydrochloric acid solution of short curing time;
d—Piping washing;
e—Well shutting-in during several hours.

For the treatment according to this invention, well conditioning is initially processed, isolating the intervals which are causing the problems with packers and bridge-plugs, trying whenever possible not to expose other formations not intended for this treatment. Next, an injectivity test is conducted with injection water; a pre-cushion of diluted hydrochloric acid is injected at approximately 0.1%; said pre-cushion is displaced; the sodium silicate/hydrochloric acid system is injected, said mixture being displaced with injection water; the well is shut-in during some hours, preferably during 24 hours.

The best results with the utilization of the systems, according to the process of the invention, are achieved when systems based on sodium silicate and hydrochloric acid of long curing time are injected initially, followed by systems based on sodium silicate and hydrochloric acid of short curing time.

With the systems and process of the invention, a radical reduction in flow rate and an increase in injection pressure in the intervals under treatment are achieved, indicating a significant reduction in their permeability.

The following examples illustrate but not limit the scope of the invention.

EXAMPLE 1

First of all, the gelling times of the systems were determined in a becker (bath at 52° C.). The results, using deionized water, injection water and polymer solution-polyacrylamide with a hydrolysis degree of 50% and 30%, are shown on tables I, II, III, and IV, respectively.

TABLE I

SOLUTION OF SODIUM SILICATE IN DEIONIZED WATER

| VOLUME OF SODIUM SILICATE SOLUTION (ml)[a] | VOLUME OF HCl 5% (ml) | TEMPERATURE (°C.) | GELLING START (min. or h) |
|---|---|---|---|
| 20 | 6.0 | 52 | 15 min |
| 20 | 5.5 | 52 | 48 min |
| 20 | 5.0 | 52 | 2 h 30 min |
| 20 | 4.9 | 52 | 5 h 45 min |
| 20 | 4.8 | 52 | 6 h |
| 20 | 4.7 | 52 | >8 h |

[a]The concentration of sodium silicate solution is 13.95% in weight of SiO$_2$.

TABLE II

SOLUTION OF SODIUM SILICATE IN INJECTION WATER

| VOLUME OF SODIUM SILICATE SOLUTION (ml)[a] | VOLUME OF HCl 5% (ml) | TEMPERATURE (°C.) | GELLING START (min. or h) |
|---|---|---|---|
| 20 | 6.0 | 52 | 10 min |
| 20 | 5.5 | 52 | 20 min |
| 20 | 5.0 | 52 | 1 h 10 min |
| 20 | 4.9 | 52 | 1 h 15 min |
| 20 | 4.8 | 52 | 1 h 45 min |
| 20 | 4.7 | 52 | 2 h |
| 20 | 4.6 | 52 | 2 h 20 min |
| 20 | 4.5 | 52 | 3 h 30 min |
| 20 | 4.4 | 52 | 4 h 30 min |
| 20 | 4.3 | 52 | 7 h 30 min |

[a]The concentration of sodium silicate solution is 13.95% in weight of SiO$_2$.

TABLE III

SOLUTION OF SODIUM SILICATE IN POLYACRYLAMIDE SOLUTION WITH HYDROLYSIS DEGREE OF 50% AND 660 PPM OF ACTIVE MATTER

| VOLUME OF SODIUM SILICATE SOLUTION (ml)[a] | VOLUME OF HCl 5% (ml) | TEMPERATURE (°C.) | GELLING START (min. or h) |
|---|---|---|---|
| 20 | 6.0 | 52 | 7 min |
| 20 | 5.5 | 52 | 10 min |
| 20 | 5.0 | 52 | 1 h |
| 20 | 4.9 | 52 | 1 h 15 min |
| 20 | 4.8 | 52 | 2 h |
| 20 | 4.7 | 52 | 2 h 15 min |
| 20 | 4.6 | 52 | 3 h 40 min |
| 20 | 4.5 | 52 | 3 h 45 min |
| 20 | 4.4 | 52 | 4 h 30 min |
| 20 | 4.3 | 52 | 5 h 30 min |

[a]The concentration of sodium silicate solution is 13.95% in weight of SiO$_2$.

TABLE IV

SOLUTION OF SODIUM SILICATE IN A POLYACRYLAMIDE SOLUTION WITH HYDROLYSIS DEGREE OF 30% AND 660 PPM OF ACTIVE MATTER

| VOLUME OF SODIUM SILICATE SOLUTION (ml)[a] | VOLUME OF HCl 5% (ml) | TEMPERATURE (°C.) | GELLING START (min. or h) |
|---|---|---|---|
| 20 | 6.0 | 52 | 15 min |
| 20 | 5.5 | 52 | 20 min |
| 20 | 5.0 | 52 | 1 h 15 min |
| 20 | 4.9 | 52 | 2 h |
| 20 | 4.8 | 52 | 2 h 30 min |
| 20 | 4.7 | 52 | 3 h |
| 20 | 4.6 | 52 | 4 h 30 min |
| 20 | 4.5 | 52 | 6 h |

[a]The concentration of sodium silicate solution is 13.95% in weight of SiO$_2$.

EXAMPLE 2

A package was prepared in a transparent acrylic tube provided with flanges and holes for injection and collection of fluids, containing a porous medium including unconsolidated, crushed samples from the Carmópolis Field (well CP-670-SE). Pressure was removed and the system was then saturated with injection water. Then, an aqueous solution of HCl at 0.1% in weight per volume was injected; this operation was completed washing (with water) the lines and the area close to the package inlet. Then, a solution of sodium silicate and hydrochloric acid of long gelling or curing time was injected, followed by a solution of sodium silicate and hydrochloric acid of short gelling time. The system was allowed to rest under a temperature of 52° C. during 24 hours, and thereafter the permeability of the system was determined once more.

The rock sample utilized was that of well CP-670-SE. The tubular package was 29 cm long, with a cross-section of 16.55 cm2 of area. The flow rate, pressure and permeability data, before and after treatment, utilizing injection water, are shown on table V.

TABLE V

| PARAMETERS | BEFORE THE TREATMENT | AFTER THE TREATMENT |
| --- | --- | --- |
| Flow rate (ml/h) | 100 | 10 |
| Pressure (psi) | 0.36 | 11 |
| Permeability (mD) | 1987 | 6.5 |

EXAMPLE 3

Example 3 was performed utilizing consolidated samples from the same well in Carmópolis; the package was 5.7 cm long, with a cross-section of 11.4 cm2; a solution of sodium silicate in injection water was used.

The flow rate, pressure and permeability data, before and after treatment, are shown on Table VI.

TABLE VI

| PARAMETERS | BEFORE THE TREATMENT | AFTER THE TREATMENT |
| --- | --- | --- |
| Flow rate (cm³/min) | 1.360 | 0.043 |
| Pressure (psi) | 0.510 | 2.070 |
| Permeability (mD) | 326 | 2.560 |

Analyzing the permeability reduction data in unconsolidated and consolidated rock samples of the Carmópolis reservoir, a drastic reduction of same may be observed after the treatment according to the invention.

EXAMPLE 4

In this example, in which the injection operation in the system was performed in the field, it was necessary:
a—Well conditioning for treatment, isolating the intervals which caused problems with packer and bridge plug utilization, trying whenever possible not to expose other perforations not intended for treatment;
b—Injectivity test with injection water;
c—Injection of a HCl pre-cushion at approximately 0.1% of weight per volume;
d—Pre-cushion displacement;
e—Injection of the sodium silicate/hydrochloric acid system;
f—Displacement with injection water;
g—Well shutting-in during at least 24 hours;
h—Well re-equipment for-injection.

Adopting the above procedure, well 8-CP-461-SE received an injection of six batches of 20 bbl each of a long-curing time system, followed by three additional batches of a short-curing time system, according to Table VII. After treatment, the well was shut-in during 24 hours; next, the operational string was removed and the well integrated to the water injection system.

TABLE VII

| BATCH | VOLUME OF SODIUM SILICATE 13.95% (bbl) | VOLUME OF HCl 5.14% (bbl) | HCl/ SILICATE RATIO | BATCH VOLUME (bbl) | PUMPING TIME (min) |
| --- | --- | --- | --- | --- | --- |
| 01 | 16.7 | 4 | 0.240 | 20.7 | 18 |
| 02 | 16.7 | 4 | 0.240 | 20.7 | 18 |
| 03 | 16.7 | 4 | 0.240 | 20.7 | 21 |
| 04 | 16.7 | 4 | 0.240 | 20.7 | 20 |
| 05 | 16.7 | 4 | 0.240 | 20.7 | 21 |
| 06 | 16.7 | 4 | 0.240 | 20.7 | 21 |
| 07 | 11.9 | 3 | 0.252 | 14.9 | 15 |
| 08 | 11.9 | 3 | 0.252 | 14.9 | 15 |
| 09 | 15.5 | 4 | 0.258 | 19.5 | 20 |

The experiment showed a drastic reduction in permeability after treatment. Thus, prior to treating the interval 630.5–631.5 m of zone CPS-1B, the profile indicated that same received 100% of the total rate of 233 m3/day, at the pressure of 37 kg/cm2; after treatment, the Full Bore Spinner log indicated that said interval now received 60% of the total rate of 150 m3/day, at the pressure of 48 kg/cm2.

EXAMPLE 5

Adopting the same procedure of the previous example, 191 bbl of hydrochloric acid at 0.34% were injected into well 8-CP-446-SE, said injection having been performed at 1.5 bpm with a wellhead pressure of 700 psi. Next, the pre-cushion was displaced with 121 bbl of injection water, followed by the injection of eight batches of a solution of sodium silicate at 13.95% with hydrochloric acid at 5.8%, according to Table VIII.

TABLE VIII

| BATCH | VOLUME OF SODIUM SILICATE 13.95% (bbl) | VOLUME OF HCl (bbl) | HCl/ SILICATE RATIO | BATCH VOLUME (bbl) | PUMPING TIME (min) |
| --- | --- | --- | --- | --- | --- |
| 01 | 16.7 | 4 | 0.240 | 20.7 | 14 |
| 02 | 16.7 | 4 | 0.240 | 20.7 | 15 |

TABLE VIII-continued

| BATCH | VOLUME OF SODIUM SILICATE 13.95% (bbl) | VOLUME OF HCl (bbl) | HCl/ SILICATE RATIO | BATCH VOLUME (bbl) | PUMPING TIME (min) |
|---|---|---|---|---|---|
| 03 | 16.7 | 4 | 0.240 | 20.7 | 16 |
| 04 | 16.7 | 4 | 0.240 | 20.7 | 15 |
| 05 | 16.7 | 4 | 0.240 | 20.7 | 17 |
| 06 | 15.5 | 4 | 0.258 | 19.5 | 15 |
| 07 | 15.5 | 4 | 0.258 | 19.5 | 16 |
| 08 | 15.5 | 4 | 0.258 | 19.5 | 15 |

Once the treatment was completed, the well was shut-in during 24 hours; after this period, the operational string was removed and the well reintegrated in the water injection system.

Thus, prior to treating the interval 590.0–592.5 m of zone CPS-1B, the profile indicated that same received 60% of the total rate of 416 m3/day at the pressure of 34 kg/cm$^2$. After treatment, the Full Bore Spinner log showed that said interval now received 8% of the total rate of 360 m3/day at the pressure of 7 kg/cm$^2$.

We claim:

1. A process for the correction of oil well productivity, or injectivity profiles, or both, comprising the steps of:
   (a) injecting a dilute solution of hydrochloric acid having a concentration less than 1% into an oil well;
   (b) injecting a solution of sodium silicate and hydrochloric acid of long-curing time;
   (c) injecting a solution of sodium silicate and hydrochloric acid of short-curing time; and
   (d) carrying out well shutting-in for several hours.

2. The process as claimed in claim 1, wherein prior to step (d) but after step (c) there is a step (c') of
   (C') carrying out pipe washing.

3. The process as claimed in claim 2, additionally comprising the steps of:
   (e) isolating the interval causing problems;
   (f) injecting a pre-cushion of a dilute hydrochloric acid solution having a concentration less than 1% into the well;
   (g) displacing said pre-cushion with injection water;
   (h) injecting a solution of sodium silicate and hydrochloric acid of long-curing time; p1 (i) injecting a solution of sodium silicate and hydrochloric acid of short-curing time;
   (j) displacing said compositions with injection water;
   (k) carrying out well shutting-in for several hours; and
   (l) carrying out well re-equipment for injection.

4. The process as claimed in claim 3, wherein the concentration of hydrochloric acid in the pre-cushion is approximately 0.1% by weight.

* * * * *